No. 684,551. Patented Oct. 15, 1901.
T. W. PRICE.
BUCKET.
(Application filed Feb. 13, 1901.)

(No Model.)

Witnesses
Bernard M. Offutt.
A. S. Cassell

Inventor
Thomas Worthington Price,
by David P. Moore.
Attorney

THE NORRIS PETERS CO., PHOTO-LITHO., WASHINGTON, D. C.

United States Patent Office.

THOMAS WORTHINGTON PRICE, OF LEXINGTON, KENTUCKY.

BUCKET.

SPECIFICATION forming part of Letters Patent No. 684,551, dated October 15, 1901.

Application filed February 13, 1901. Serial No. 47,135. (No model.)

*To all whom it may concern:*

Be it known that I, THOMAS WORTHINGTON PRICE, a citizen of the United States, residing at Lexington, in the county of Fayette and State of Kentucky, have invented certain new and useful Improvements in Buckets, of which the following is a specification.

My invention relates to improvements in buckets; and the main object of my invention is the provision of a bucket provided with a plain surface half around the outside and the other surface being provided with corrugations or serrations to form a series of horizontal ridges.

To attain the desired object, the invention consists of a bucket to be used as a washing-board embodying novel features of construction, substantially as disclosed herein.

Figure 1:
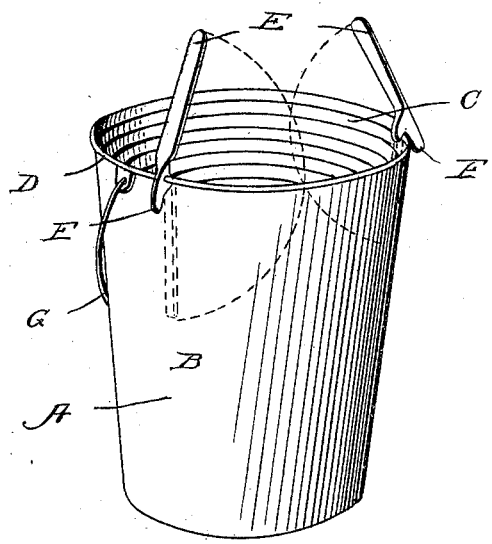
Figure 2:
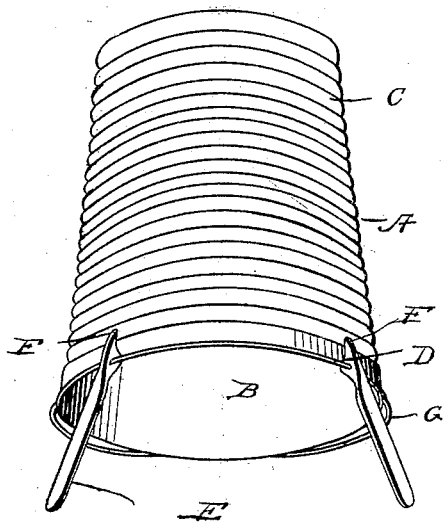
Figure 3:
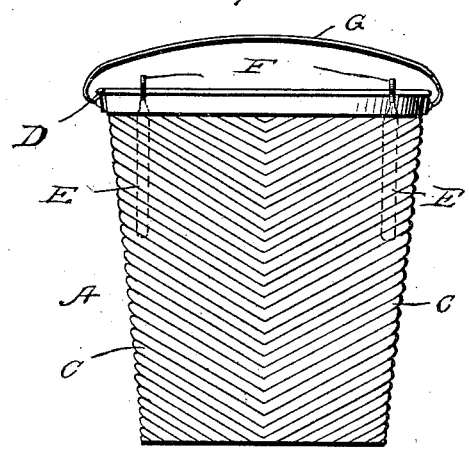

In the drawings, Figure 1 is a perspective view of the bucket with the plain side in view. Fig. 2 is a similar view of the bucket placed in the position when in use as a washboard, and Fig. 3 is a side elevation of a modification.

Referring to the drawings, A designates a bucket which is provided with the plain surface B, which extends around one-half of the bucket, and the corrugated or serrated surface C, which occupies the remaining half of the bucket-surface. These corrugations can be arranged in series either horizontally, as shown in Fig. 2, or inclined, as shown in Fig. 3, as may be desired. Around the upper edge of the bucket is a rim D, upon which are pivoted the pair of legs E, which are provided with the short projections or abutments F, which are adapted to engage the outer surface of the bucket, as shown in Fig. 2, in order that they will securely support the bucket in an inclined position. I further provide a bail or handle G in order that the bucket may be readily carried. It will be seen that the legs of the bucket will fall into proper position inside when the bucket is resting upon its bottom, and when inverted they will assume the proper position to support the bucket, so as to present the rough side or washing-surface. From this description, taken in connection with the drawings, it is evident that I provide a bucket having a washing-surface formed thereon, thereby producing an article which is readily adaptable for camp use or, in fact, may be used by any person desiring to dispense with a washboard, as he has a bucket and washboard combined in the one article.

What I claim, and desire to secure by Letters Patent, is—

As an article of manufacture, a sheet-metal bucket having one-half of its body corrugated to form a washboard, and provided with a pair of legs each having a short projection to engage the outside of the bucket pivoted to the rim of the bucket in such a manner that when the bucket rests upon its bottom the legs fall into the bucket, and when the bucket is inverted they fall downward and are braced by the projections to support the bucket in an inclined position to present the rubbing-surface thereof.

In testimony whereof I affix my signature in presence of two witnesses.

THOMAS WORTHINGTON PRICE.

Witnesses:
J. M. CHESNEY,
R. N. BARBOUR.